Jan. 15, 1957 W. M. ENGBERG ET AL 2,777,335
HAND APPARATUS FOR CONTROLLING BRAKES AND ACCELERATORS
Filed Oct. 4, 1954 3 Sheets-Sheet 1

INVENTORS
WILLIAM M. ENGBERG
WILLIAM D. WELLS
ATTORNEYS

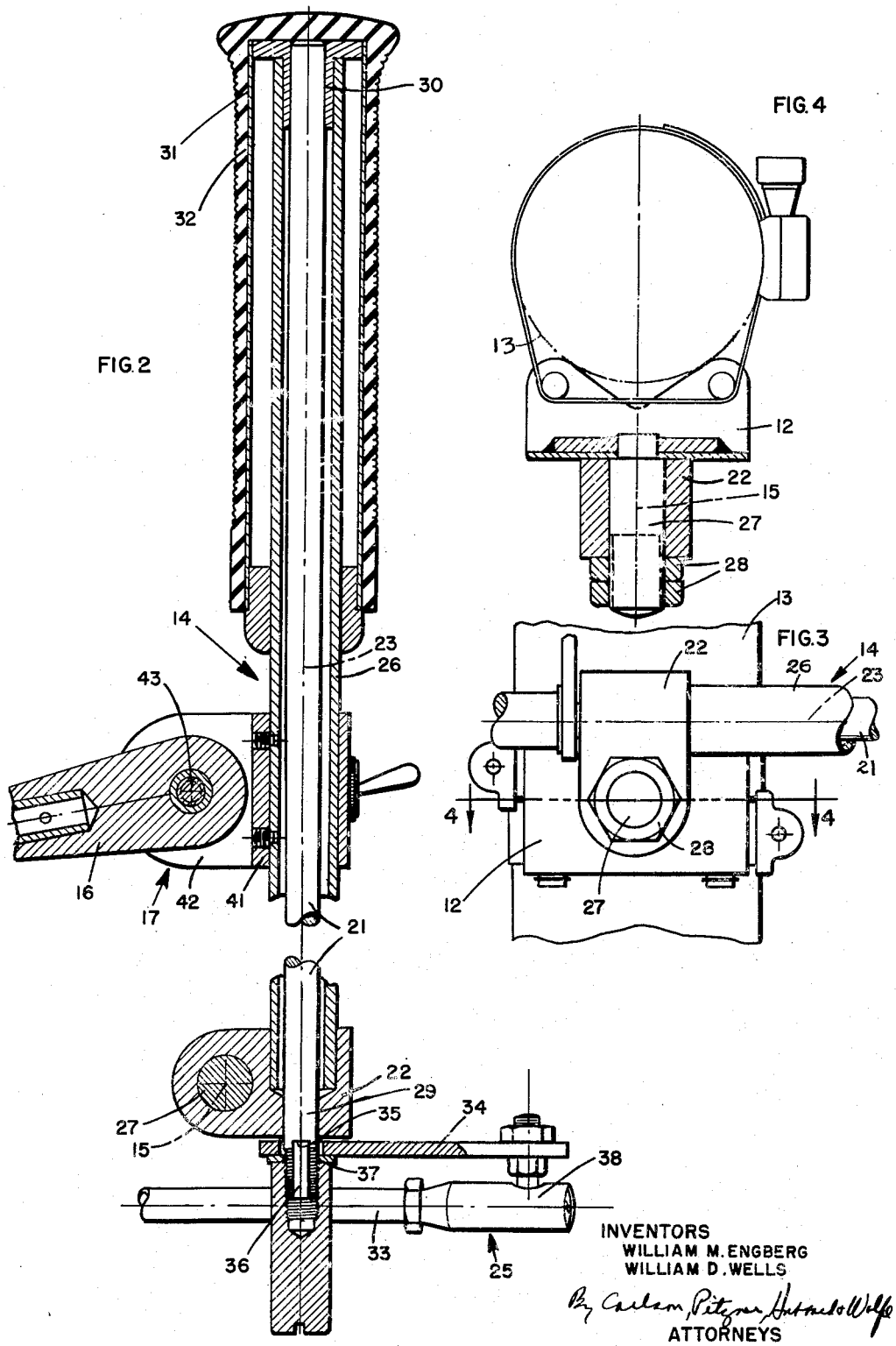

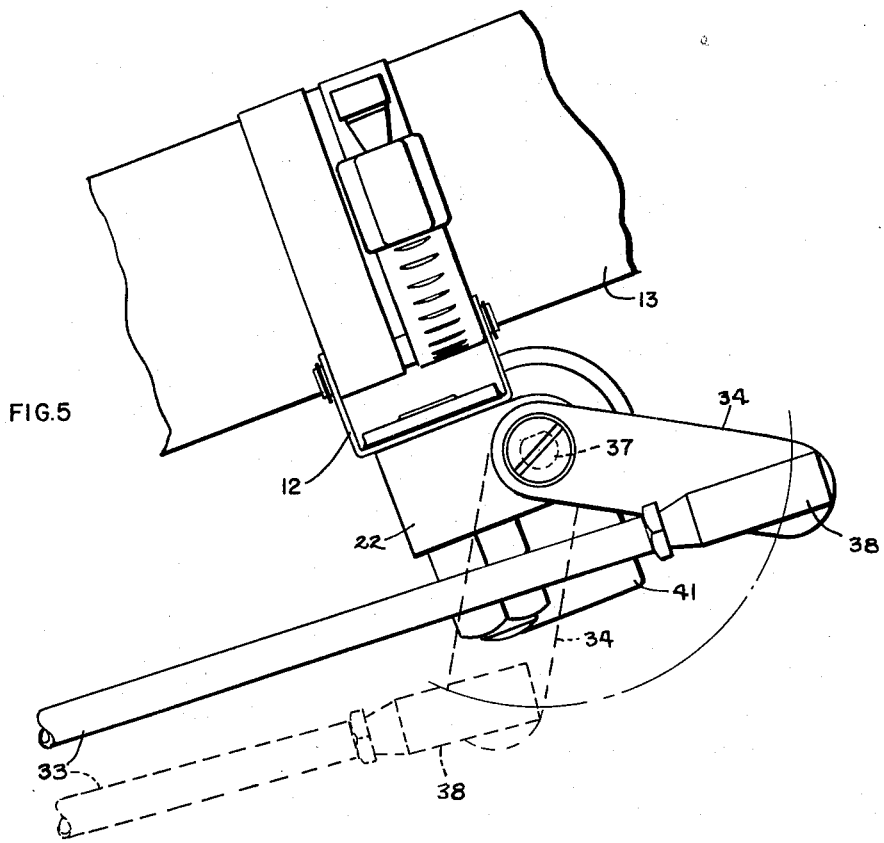

United States Patent Office 2,777,335
Patented Jan. 15, 1957

2,777,335

HAND APPARATUS FOR CONTROLLING BRAKES AND ACCELERATORS

William M. Engberg and William D. Wells, Rockford, Ill.

Application October 4, 1954, Serial No. 459,898

3 Claims. (Cl. 74—481)

This invention relates to apparatus adapted to be connected to the accelerator and brake actuating mechanisms of an automotive vehicle for operating such mechanisms by hand while avoiding interference with the normal operation thereof by the usual foot pedals.

One object of the invention is to provide novel apparatus of the above character having a single manually movable control member operable selectively to actuate the vehicle brake and accelerator either individually or simultaneously.

The invention also resides in the novel and simple character of the structure which is readily adaptable to different vehicles and is located out of the way to avoid interference with the pedals.

Other objects and advantages of the invention will become apparent from the following detailed description taken in connection with the accompanying drawings, in which:

Fig. 2 is a fragmentary sectional view taken along the line 2—2 of Fig. 1.

Fig. 3 is a fragmentary front elevational view of the apparatus looking upwardly and to the left as viewed in Fig. 1.

Fig. 4 is a sectional view taken along the line 4—4 of Fig. 3.

Fig. 5 is a fragmentary end elevational view of the apparatus looking to the right as viewed in Fig. 1.

Figure 1:
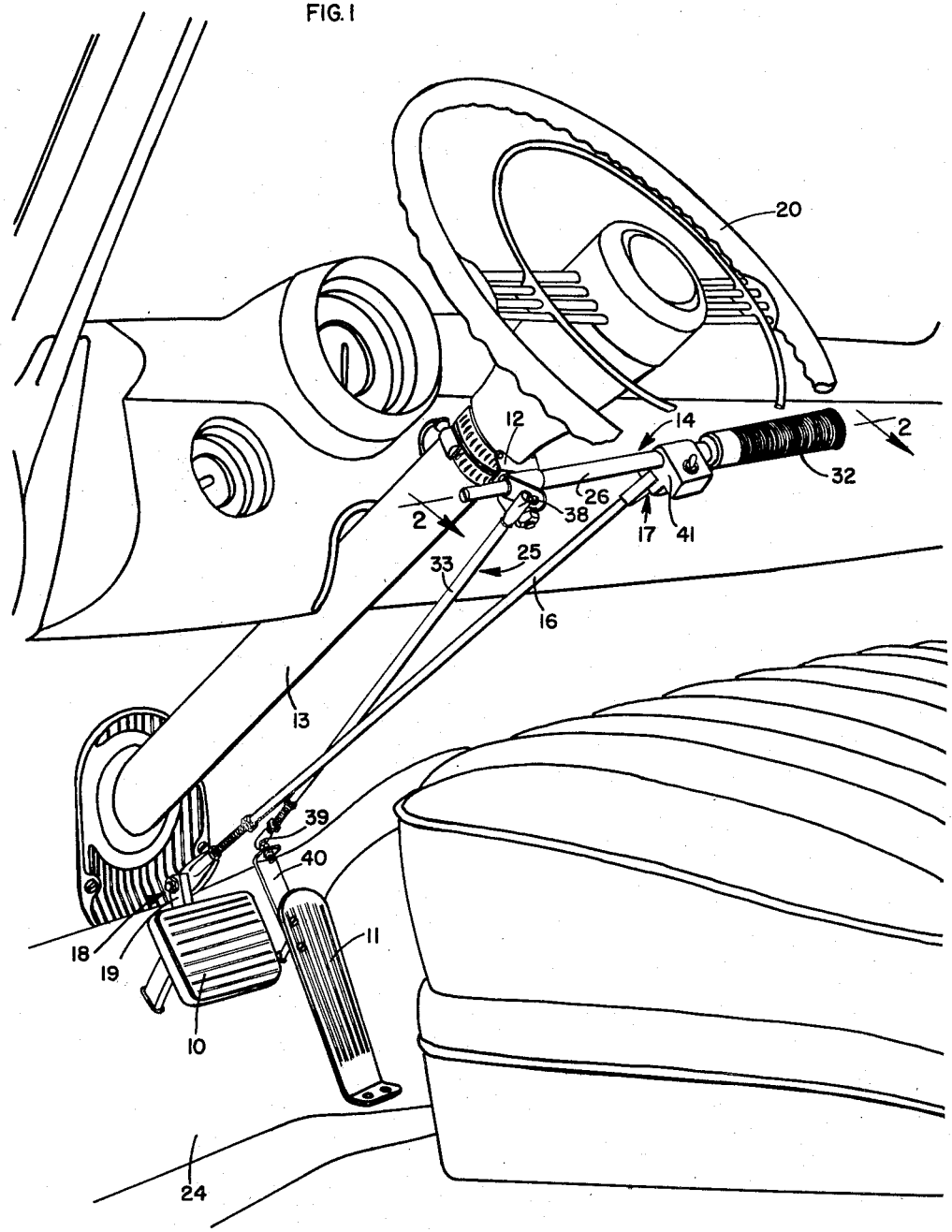
Figure 1 is a perspective view of the interior of a vehicle equipped with apparatus embodying the novel features of the present invention.

In the drawings, the invention is shown for purposes of illustration embodied in apparatus for controlling the brake and accelerator pedals 10 and 11 of an automotive vehicle by hand while leaving the same accessible for the usual foot operation. Generally, the apparatus is of the type including a bracket 12 adapted to be secured to the vehicle steering column 13 and having a lever 14 fulcrumed thereon for bodily swinging movement toward and away from the vehicle floorboard about an axis 15 extending transversely of the steering column. A link 16 pivotally connected at 17 to the lever and at 18 to a plate 19 on the brake pedal 10 and extending longitudinally of the steering column acts in compression to depress the brake pedal when the lever is pushed downwardly away from the operator. The usual brake return spring (not shown) acts through the pedal and the link to return the lever to a horizontal position beneath the steering wheel 20 when downward pressure on the lever is released.

To simplify manual operation of the vehicle brakes and accelerator with apparatus of the above character, the invention contemplates a novel construction of the lever 14 permitting actuation of the brakes and the accelerator either independently of each other or simultaneously in response to movement of a single control element 21. For this purpose, the lever is formed in two parts one of which is a member 22 mounted on the bracket 12 to swing bodily about the lever axis 15. The other part of the lever is the control element 21 which is supported by the member 22 so as to swing bodily therewith and also to rotate relative thereto about a second axis 23 extending transversely of the lever axis and the steering column, such rotary motion of the control element being utilized to oscillate the accelerator pedal 11 toward and away from the vehicle floorboard 24 by a connection 25.

In the present instance, the mounting member 22 is a block having a hollow arm 26 projecting rigidly therefrom and horizontally beneath the steering wheel 20. A stud 27 projecting from the bracket 12 and normal to the steering column 13 extends through the block and rotatably supports the block and the arm for swinging movement about the lever axis 15, nuts 28 retaining the block on the stud. The control element 21 is a shaft telescoping with and extending through the arm 26 with its inner end portion 29 journaled in and extending through the block. At its other end, the shaft is rotatably mounted on the arm 26 through the medium of a flanged collar 30 which is journaled in the arm and is secured to the shaft and a sleeve 31. The latter is rotatable on the exterior of the arm and enclosed by a tubular cover 32 of resilient material pressed on and frictionally gripping the sleeve to constitute a handle.

The connection 25 between the accelerator pedal 11 and the control shaft 21 includes a rod or link 33 of adjustable length extending between the pedal and the outer end of an arm 34 which projects rigidly from the shaft and cooperates therewith to define a crank. To avoid longitudinal shifting of the link and actuation of the accelerator during swinging of the lever 14 about its axis, the crank arm is located closely adjacent the lever axis 15. In this instance, the crank arm 34 is a flat bar clamped against a shoulder 35 on the inner end portion 29 of the shaft, the shaft end portion being flattened as indicated at 36 and the bar having a hole 37 (Figs. 2 and 5) of corresponding shape so that the two rotate together. To avoid binding of the parts, joints 38 and 39 pivotally connecting opposite ends of the accelerator link 33 to a plate 40 on the accelerator pedal 11 and to the outer end of the crank arm are of the ball and socket type.

As in the case of the accelerator link 33, the brake link 16 is adjustable in length and the pivotal connection 18 between the link and the plate 19 on the brake pedal 10 is of the ball and socket type. At the other end of the brake link, the pivotal connection 17 with the lever 14 comprises a yoke 41 secured to the lever arm 26 adjacent the handle 32 and having spaced legs 42 straddling the link and spanned by a pin 43 extending through and journaled in the link. Where, as shown, the apparatus is mounted on the steering column with the lever 14 projecting to the right therefrom, the brake link 16 extends beneath and crosses under the accelerator link 33, both links extending longitudinally of the steering column and adjacent the underside thereof to avoid interference with operation of the pedals by the driver's feet.

Assuming that the apparatus has been mounted on the steering column 13 and connected to the brake and accelerator pedals 10 and 11 as described above, with the lengths of the links 16 and 33 properly adjusted, the lever 14 will be urged by the brake return spring to a generally horizontal position beneath the steering wheel 20 and the crank arm 34 will be urged by the accelerator return spring to the generally horizontal position shown in full in Fig. 5. To apply the brakes, the operator grasps the handle 32 and moves the same bodily toward the floorboard 24 to swing the lever downwardly and, through the brake link 16, depress the brake pedal 10. During movement of the lever 14 about its axis 15, the outer end of the crank arm 34 swings in an arc extending transversely of the accelerator link 33 so that the axial position of the latter and the position of the accelerator pedal 11 remain substantially the same, the ball and socket joints 38 and 39 permitting such movement without binding of the parts.

Actuation of the accelerator is effected simply by turning of the handle 32 and therewith the shaft 21 relative to the member 22 about the second axis 23. Such turning of the handle in a clockwise direction as viewed in Fig. 5 swings the crank arm downwardly as shown in phantom and depresses the accelerator pedal 11, rotation of the handle in the opposite direction raising the pedal. During such rotation, the setting of the lever 14 remains undisturbed. Upon release of the handle, the parts return to their inactive positions described above.

It will be apparent that the novel apparatus described above enables the vehicle operator to control both the accelerator and the brakes with only one hand, the position of which on the handle 32 remains the same so as to require little attention of the operator. The movement of the lever 14 to actuate the brakes is a natural movement of the operator, that is, downwardly toward the floorboard 24. Such movement is the same whether the lever projects to the right of the steering column as shown or the left as permitted by loosening the bracket 12 and changing its position on the column 13. The apparatus is readily adaptable to different vehicles simply by changing the position of the bracket on the column and the lengths of the links 16 and 33, the ball and socket joints 18, 38, and 39 on the links permitting variation in the angles of these parts relative to the crank arm 34 and the pedals 10 and 11 of different vehicles without binding of the parts.

We claim as our invention:

1. In apparatus for controlling the brakes and accelerator of a vehicle, the combination of, a mounting bracket adapted to be secured to the steering column of the vehicle, a member mounted on said bracket to swing bodily about a first axis extending transversely of said column, said member including a rigid hollow arm projecting outwardly from said axis and beneath the vehicle steering wheel, a shaft journaled on said member and extending through said hollow arm from the projecting end of the latter to a point beyond the other end thereof, said shaft cooperating with said member to define a lever swingable toward and away from the vehicle floorboard, a rod pivotally connected at one end to the projecting end portion of said hollow arm and adapted at its other end to be connected to the vehicle brake pedal for depressing the latter by swinging the lever including the arm toward said floorboard, a crank arm projecting rigidly from said shaft adjacent said other hollow arm end, a rod pivotally connected at one end to said crank arm and adapted to be connected at its other end to the vehicle accelerator pedal for depressing the latter by turning said shaft relative to said member, and a handle journaled on said projecting lever arm end and secured to the adjacent end of said shaft for swinging said lever bodily and for rotating said shaft relative to said member.

2. In apparatus for controlling the brakes and accelerator of a vehicle, the combination of, a mounting bracket adapted to be secured to the steering column of the vehicle, a member mounted on said bracket to swing bodily about a first axis extending transversely of said column, a shaft journaled on said member for rotation about a second axis extending transversely of said column and said first axis, a crank arm projecting rigidly from said shaft adjacent said first axis, said shaft cooperating with said member to define a lever projecting from said first axis and beneath the vehicle steering wheel and swingable toward and away from the vehicle floorboard about the first axis, an elongated first element connected at one end to the projecting end portion of said lever and adapted at its other end to be connected to the vehicle brake pedal for depressing the latter and applying the brakes by swinging of the lever toward said floorboard, a second element adapted at one end to be connected to the vehicle accelerator, and a ball and socket joint connecting said crank arm and the other end of said second element for converting rotary motion of said shaft to oscillating motion of the element while avoiding binding of these parts.

3. In apparatus for controlling the brakes and accelerator of a vehicle, the combination of, a mounting bracket adapted to be secured to the steering column of the vehicle, a member mounted on said bracket to swing bodily about a first axis extending transversely of said column, a shaft journaled on said member for rotation about a second axis extending transversely of said column and said first axis, said shaft projecting at one end beneath the vehicle steering wheel and cooperating with said member to define a lever fulcrumed on said first axis, an accelerator element connected to said shaft adjacent said first axis and adapted to be connected to the vehicle accelerator for actuating the latter by turning the shaft about said second axis, and a second element connected to said lever adjacent said projecting shaft end and adapted for connection to the vehicle brakes for actuation of the latter by swinging the lever about said fulcrum thereof.

References Cited in the file of this patent

UNITED STATES PATENTS

| | | |
|---|---|---|
| 652,943 | Whitney | July 3, 1900 |
| 2,602,348 | Wilson | July 8, 1952 |